US007299305B2

(12) United States Patent
Kim

(10) Patent No.: US 7,299,305 B2
(45) Date of Patent: Nov. 20, 2007

(54) APPARATUS AND METHOD FOR INDICATING CONNECTION STATE OF INPUT/OUTPUT CABLE

(75) Inventor: Dong-yeon Kim, Metropolitan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 217 days.

(21) Appl. No.: 10/729,998

(22) Filed: Dec. 9, 2003

(65) Prior Publication Data
US 2004/0128403 A1 Jul. 1, 2004

(30) Foreign Application Priority Data
Dec. 30, 2002 (KR) ............... 10-2002-0087150

(51) Int. Cl.
G06F 13/10 (2006.01)
G06F 15/177 (2006.01)
(52) U.S. Cl. ............... 710/15; 710/8; 710/10
(58) Field of Classification Search ............ None
See application file for complete search history.

(56) References Cited

U.S. PATENT DOCUMENTS 5,619,544 A  4/1997  Lewis et al. ............ 375/377
5,751,965 A * 5/1998 Mayo et al. ............ 709/224
6,105,107 A  8/2000  Ho et al. ............ 711/112
6,457,071 B1 * 9/2002 Thorland et al. ............ 710/19
6,675,243 B1 * 1/2004 Bastiani et al. ............ 710/105
2004/0083315 A1 * 4/2004 Grassian et al. ............ 710/14

FOREIGN PATENT DOCUMENTS

JP  4-31948  2/1992
KR  8933  2/2000

* cited by examiner

Primary Examiner—Ilwoo Park
(74) Attorney, Agent, or Firm—Staas & Halsey LLP

(57) ABSTRACT

An apparatus and method for indicating the connection state of an input/output cable between an ATAPI drive and a host. The apparatus includes an indicator and a controller. The indicator is a communication device between an AT Attachment Packet Interface (ATAPI) drive and a host interconnected via the input/output cable and indicates in response to a control signal whether the AT Attachment Packet Interface (ATAPI) drive is connected to or disconnected from the host via the input/output cable. The controller sets a flag to check the connection state of the input/output cable, when power is applied to the AT Attachment Packet Interface (ATAPI) drive, and outputs the control signal to the indicator to indicate that the input/output cable is not connected to the host when a command is not received from the host for a predetermined period of time.

6 Claims, 2 Drawing Sheets

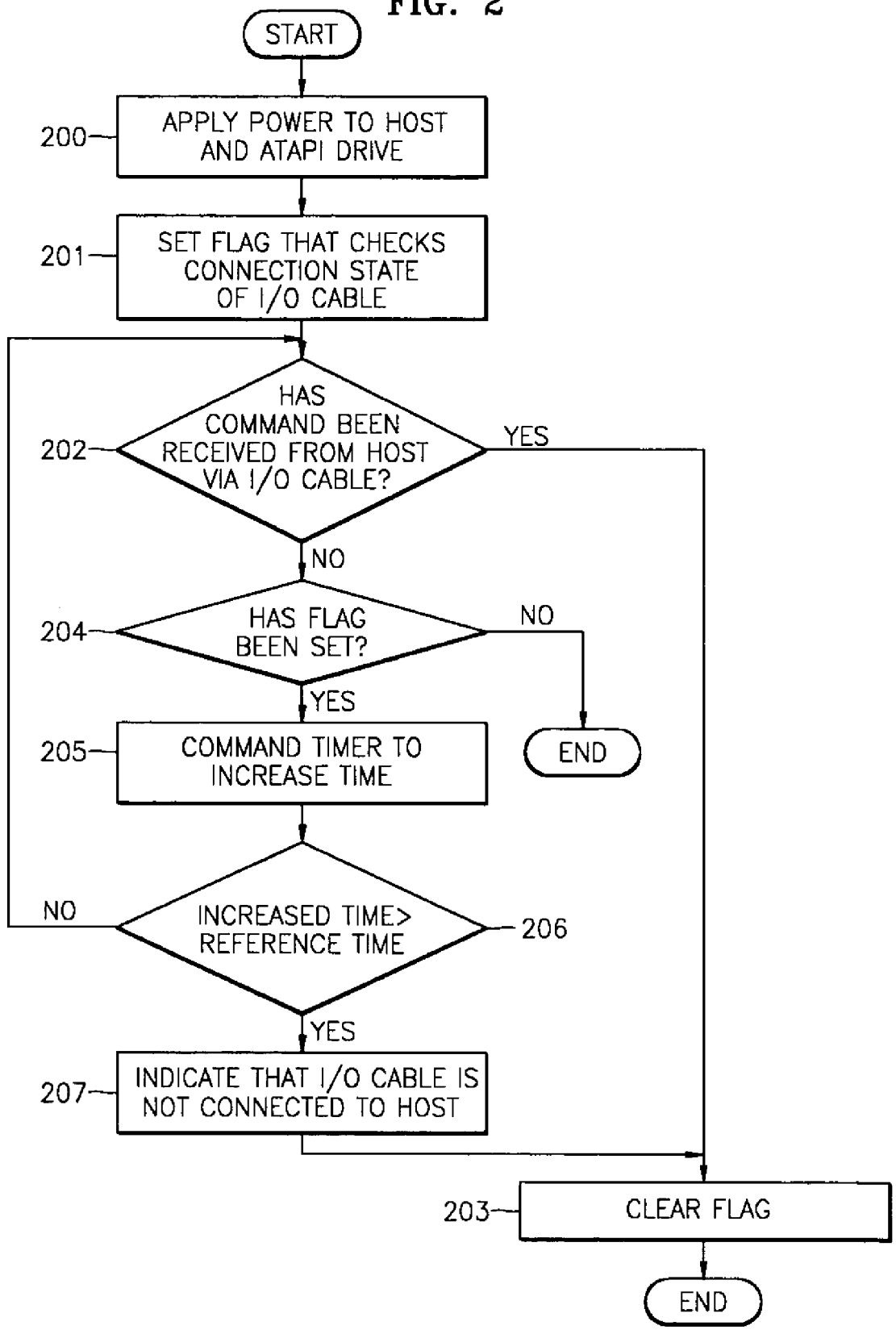

APPARATUS AND METHOD FOR INDICATING CONNECTION STATE OF INPUT/OUTPUT CABLE

CROSS-REFERENCE TO RELATED APPLICATIONS

This application claims the priority of Korean Patent Application No. 2002-87150, filed on Dec. 30, 2002, in the Korean Intellectual Property Office, the disclosure of which is incorporated herein in its entirety by reference.

BACKGROUND OF THE INVENTION

1. Field of the Invention

The present invention relates to an apparatus and method for operating an AT Attachment Packet Interface (ATAPI) drive, and more particularly, to an apparatus and method for indicating a connection state of an input/output cable between an ATAPI drive and a host.

2. Description of the Related Art

ATAPI drives refer to optical storage devices, such as digital versatile disc (DVD)_read only memory (ROM) drives, CD-ROM drives, CD-RW, CD-R, and tape backup drives that communicate with a computer using an ATAPI protocol. Since the ATAPI drives communicate with the computer using drivers, the drivers must be registered in memory in advance when an operating system (OS) is booted. Therefore, unlike hard discs, the ATAPI drives can communicate with the computer only if the driver is properly loaded in that case.

A technique for communications between such an ATAPI drive and a computer is disclosed in U.S. Pat. No. 6,105,107.

An ATAPI drive transmits and receives signals with a computer via an input/output (I/O) cable. Even when the ATAPI drive does not receive a command from the computer, the ATAPI drive can operate by applied power. Most ATAPI drives are installed in computers, and can appear operable due to a user mistake or for other reasons even when an I/O cable is not connected properly. In this case, the user cannot access the ATAPI drives. Accordingly, it is difficult to check why the ATAPI drives do not work. Even when the user suspects that the I/O cable is not connected properly, the user cannot find out the exact cause of the abnormality of the ATAPI drives without disassembling the computer.

SUMMARY OF THE INVENTION

The present invention provides an apparatus and method for indicating the connection state of an I/O cable by which a user can easily check the connection state between an ATAPI drive and a host and utilize the check result to correct the connection problem.

According to an aspect of the present invention, there is provided an apparatus for indicating a connection state of an input/output cable. The apparatus includes an indicator and a controller. The indicator is a communication device between an AT Attachment Packet Interface (ATAPI) drive and a host interconnected via the input/output cable and that indicates in response to a control signal whether the ATAPI drive is connected to or disconnected from the host via the input/output cable. The controller sets a flag to check the connection state of the input/output cable, when power is applied to the ATAPI drive, and outputs the control signal to the indicator to indicate that the input/output cable is not connected to the host when a command is not received from the host for a predetermined period of time.

The apparatus further includes a timer that counts a time required for receiving the command from the host.

In an aspect of the present invention, the indicator is a light emitting diode that turns on in response to the control signal output from the controller, when the host is connected to the ATAPI drive via the input/output cable, and turns off when the host is not connected to the ATAPI drive via the input/output cable.

In another aspect of the present invention, the controller clears the set flag when the command is received from the host within the predetermined period of time.

In an aspect of the present invention, the controller clears the set flag after the indicator indicates that the input/output cable is not connected to the host.

According to another aspect of the present invention, there is provided a method of indicating a connection state of an input/output cable via which an AT Attachment Packet Interface (ATAPI) drive communicates with a host. The method includes: when power is applied to the AT Attachment Packet Interface (ATAPI) drive, setting a flag that checks the connection state of the input/output cable; if a command is not received from the host for a predetermined period of time after the flag is set, commanding a timer to increase a time; and if the increased time exceeds a reference time, indicating that the input/output cable is not connected to the host.

In commanding the timer to increase the time, if the command is received from the host for the predetermined period of time, the set flag is cleared.

After the indication that the input/output cable is not connected to the host, the set flag is cleared.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a flowchart for explaining a method of indicating a connection state of an I/O cable, according to an embodiment of the present invention.

DETAILED DESCRIPTION OF THE EMBODIMENTS

Figure 1:
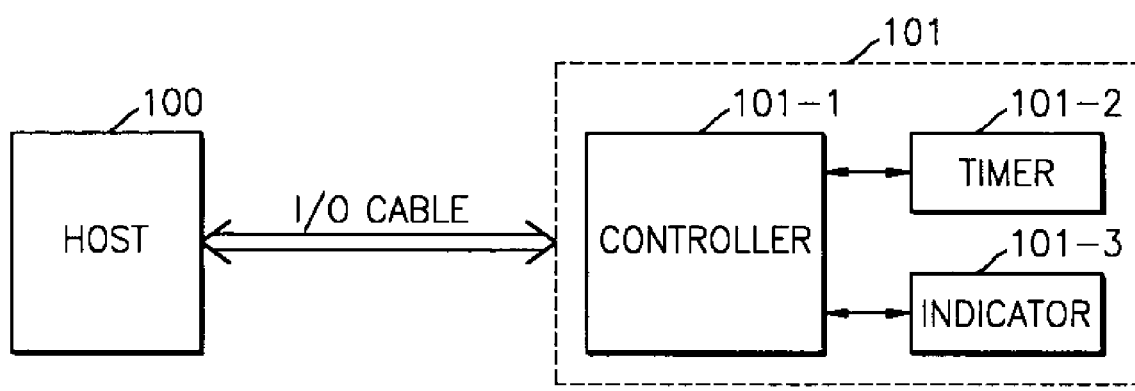
FIG. 1 is a block diagram of an apparatus for indicating the connection state of an I/O cable, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of an apparatus for indicating the connection state of an I/O cable, according to an embodiment of the present invention. The apparatus includes a host 100 and an ATAPI drive 101. The host 100 is connected to the ATAPI drive 101 via an I/O cable. The ATAPI drive 101 includes a controller 101-1, a timer 101-2, and an indicator 101-3.

FIG. 2 is a flowchart for explaining a method of indicating the connection state of an I/O cable, according to an embodiment of the present invention. Referring to FIG. 2, in operation 200, power is applied to a host and an ATAPI drive. In operation 201, a flag is set to check whether an I/O cable is connected. In operation 202, a determination is made as to whether a command is received from the host via the I/O cable. If in operation 202, it is determined that the command has been received from the host via the I/O cable, in operation 203, the flag is cleared. If in operation 202, it is determined that the command has not been received from the host via the I/O cable, in operation 204, a determination is made as to whether the flag has been set. If in operation 204, it is determined that the flag has not been set, the process ends. If in operation 204, it is determined that the flag has been set, in operation 205, a timer increases a time count. In operation 206, a determination is made as to whether the increased time exceeds a reference time. If in operation 206, it is determined that the increased time exceeds the reference time, in operation 207, a disconnection of the I/O cable from the host is indicated.

The above-described apparatus and method will be explained in more detail with reference to FIGS. 1 and 2.

The apparatus will be first explained with reference to FIG. 1.

When power is applied to the host 100 and the ATAPI drive 101, the ATAPI drive 101 initializes various software programs and hardware components and goes to a main loop. Before the ATAPI drive 101 goes to the main loop, the ATAPI drive 101 checks whether the I/O cable is connected between the host 100 and the ATAPI drive 101. Next, the ATAP drive 101 performs an operation corresponding to the check result. The ATAPI drive 101 includes the controller 101-1, the timer 101-2, and the indicator 101-3.

When power is applied to the ATAPI drive 101, the controller 101-1 sets a specific flag to check whether the I/O cable is connected. Thereafter, the controller 101-1 waits to receive a command from the host 100. If the controller 101-1 receives the command from the host 100 after setting the specific flag, the controller 101-1 clears the specific flag and stops checking whether the I/O cable is connected. Here, the controller 101-1 may output an indication control signal to the indicator 101-3 to indicate that the I/O cable is connected between the host 100 and the ATAPI drive 101.

However, if the controller 101-1 does not receive the command from the host 100, the controller 101-1 re-checks whether the flag has been set. If it is determined that the flag has been set, the controller 101-1 commands the timer 101-2 to increase the time count. Next, the controller 101-1 determines whether the increased time exceeds a reference time, for example, about 1 minute. If it is determined that the increased time exceeds the reference time, the controller 101-1 determines that the I/O cable has not been connected between the host 100 and the ATAPI drive 101. The controller 101-1 may output an indication control signal to the indicator 101-3 to indicate that the I/O cable is not connected between the host 100 and the ATAPI drive 101. The indicator 101-3 indicates in response to the indication control signal that the I/O cable is not connected between the host 100 and the ATAPI drive 101. The indicator 101-3 may be a light emitting diode (LED). Thus, if the host 100 is connected to the ATAPI drive 101 via the I/O cable, the indicator 101-3 may turn off in response to the indication control signal. If the host 100 is not connected to the ATAPI drive 101 via the I/O cable, the indicator 101-3 may turn on in response to the indication control signal. After the indicator 101-3 indicates whether the I/O cable is connected between the host 100 and the ATAPI drive 101, the controller 101-1 clears the flag and stops checking whether the I/O cable is connected between the host 100 and the ATAPI drive 101. Alternatively, different colored LEDs or labeled LEDs may be used to indicate the connection state of the I/O cable.

Next, the method will be described with reference to FIG. 2. In operation 200, power is applied to the host 100 and the ATAPI drive 101. The ATAPI drive 101 then initializes various software programs and hardware components and goes to the main loop. Prior to going to the main loop, the ATAPI drive 101 checks whether the I/O cable is connected between the host 100 and the ATAPI drive 101 and performs an operation corresponding to the check result.

In operation 201, the controller 101-1 sets the flag which checks a connection state of the I/O cable.

In operation 202, the controller 101-1 determines whether the command is received from the host 100 via the I/O cable.

If in operation 202, it is determined that the command has been received from the host 100 via the I/O cable, in operation 203, the controller 101-1 clears the flag. In other words, when the controller 101-1 sets the flag and then receives the command from the host 100, the controller 101-1 clears the flag and stops checking the connection state of the I/O cable. The controller 101-1 may output the indication control signal to the indicator 101-3 to indicate that the I/O cable is connected between the host 100 and the ATAPI drive 101.

If in operation 202, it is determined that the command has not been received from the host 100 via the I/O cable, in operation 204, the controller 101-1 rechecks whether the flag has been set.

If in operation 204, it is determined that the flag has been set, in operation 205, the controller 101-1 commands the timer 101-2 to increase a time counter.

In operation 206, the controller 101-1 determines whether the increased time exceeds a reference time preset by the timer 101-2. If in operation 206, it is determined that the increased time does not exceed the reference time, the controller 101-1 returns to operation 202.

If in operation 206, it is determined that the increased time exceeds the reference time, in operation 207, the controller 101-1 determines that the I/O cable has not been connected between the host 100 and the ATAPI drive 101 and outputs the indication control signal to the indicator 101-3 so as to indicate this determination result. As a result, the indicator 101-3 indicates in response to the indication control signal that the I/O cable is not connected between the host 100 and the ATAPI drive 101. The indicator 101-3 may be a light emitting diode (LED). As an example, if the host 100 is connected to the ATAPI drive 101 via the I/O cable, the indicator 101-3 may turn off in response to the indication control signal. If the host 100 is not connected to the ATAPI drive 101 via the I/O cable, the indicator 101-3 may turn on in response to the indication control signal. After the indicator 101-3 indicates whether the I/O cable is connected between the host 100 and the ATAPI drive 101, the controller 101-1 clears the flag and stops checking whether the I/O cable is connected between the host 100 and the ATAPI drive 101.

As described above, according to the present invention, a user can check the connection state of an I/O cable between an ATAPI drive and a host and take the necessary action to remedy the problem. When the I/O cable is not connected between the ATAPI drive and the host, an indicator indicates the disconnection state of the I/O cable. Thus, the user can check the indication result via the indicator and directly connect the I/O cable between the ATAPI drive and the host.

As a result, the user can solve the disconnection problem without calling or visiting an after-sale service (A/S) center.

Although a few exemplary embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for indicating a connection state of an input/output cable, comprising:
    an indicator that is a communication device between an AT Attachment Packet Interface (ATAPI) drive and a host interconnected via the input/output cable and that indicates in response to a control signal whether the AT Attachment Packet Interface (ATAPI) drive is connected to or disconnected from the host via the input/output cable;
    a timer that counts a time required for receiving the command from the host; and
    a controller that sets a flag to check the connection state of the input/output cable, when power is applied to the AT Attachment Packet Interface (ATAPI) drive, and outputs a signal to the timer to increase a time counter, when a command is not received from the host for a predetermined period of time after determining the flag is set, and outputs the control signal to the indicator to indicate that the input/output cable is not connected to the host when the increased time exceeds a reference time,
    wherein the indicator is a light emitting diode that turns on in response to the control signal output from the controller, when the host is connected to the AT Attachment Packet Interface (ATAPI) drive via the input/output cable, and turns off when the host is not connected to the AT Attachment Packet Interface (ATAPI) drive via the input/output cable, and
    the controller clears the set flag when the command is received from the host for the predetermined period of time.

2. The apparatus of claim 1, wherein the controller clears the set flag after the indicator indicates that the input/output cable is not connected to the host.

3. A method of indicating a connection state of an input/output cable via which an AT Attachment Packet Interface (ATAPI) drive communicates with a host, the method comprising:
    when power is applied to the AT Attachment Packet Interface (ATAPI) drive, setting a flag that checks the connection state of the input/output cable;
    if a command is not received from the host for a predetermined period of time after determining the flag is set, commanding a timer to increase a time counter; and
    if the increased time exceeds a reference time, indicating that the input/output cable is not connected to the host,
    wherein in commanding the timer to increase the time counter, if the command is received from the host within the predetermined period of time, the set flag is cleared.

4. The method of claim 3, wherein after the indication that the input/output cable is not connected to the host, the set flag is cleared.

5. The method of claim 3, wherein if the command is received from the host, signaling that the input/output cable is connected.

6. The method of claim 3, wherein indicating that the input/output cable is not connected to the host comprises turning on a light emitting diode.

* * * * *